United States Patent [19]
Niimi

[11] Patent Number: 5,194,790
[45] Date of Patent: Mar. 16, 1993

[54] CONTROL DEVICE FOR CONTROLLING A SERVO MOTOR

[75] Inventor: Yoshihiro Niimi, Toyata, Japan

[73] Assignee: Brother Kogyo Kabushiki Kaisha, Nagoya, Japan

[21] Appl. No.: 668,618

[22] Filed: Mar. 13, 1991

[30] Foreign Application Priority Data

May 14, 1990 [JP] Japan .................................. 2-63598

[51] Int. Cl.$^5$ ...................... G05D 3/00; G05B 19/24
[52] U.S. Cl. .................................. 318/567; 318/573;
318/569; 112/121.12; 364/474.3
[58] Field of Search .................... 318/560–632,
318/696, 685; 364/474.01–474.29, 474.30;
112/121.12, 121.14, 456, 445, 458

[56] References Cited

U.S. PATENT DOCUMENTS

4,941,104  7/1990  Teshima et al. ..................... 318/567

Primary Examiner—Paul Ip
Attorney, Agent, or Firm—Oliff & Berridge

[57] ABSTRACT

A servo motor control device which performs suitable interpolation when given an external move command and for setting a target position on each coordinate axis is provided. The device comprises a revolution controller and a position detector for each axis of movement as well as a control gain controller. The revolution controller controls the number of revolutions of each of the servo motors involved using a control gain set individually for each coordinate axis and in accordance with a deviation between the current position of an object and a target position thereof. Based on control response delays which occur relative to each axis, the control gain controller changes a control gain individually set for each coordinate axis. In turn, the revolution controller controls the revolutions of each servo motor using the changed control gain. For any coordinate axis having no response delay, the control gain controller leaves a reference control gain unchanged. In this manner, the speed and number of revolutions of the servo motors are controlled so as to move the object to the target position.

16 Claims, 5 Drawing Sheets

|  | Kpo |
|---|---|
| Δt | Kpy |
| 2×Δt | Kpz |

CONTROL DEVICE FOR CONTROLLING A SERVO MOTOR

BACKGROUND OF THE INVENTION

1. Field of the Invention

This invention relates to a control device for controlling servo motors, and more particularly to a control device for controlling and driving a plurality of servo motors to move an object to a predetermined position within a mechanical coordinate system.

2. Discussion of the Related Art

Machine tools conventionally include a tool for tooling a workpiece and a table for supporting the workpiece. Machine tools are conventionally equipped with a servo motor control device for driving and controlling a plurality of servo motors to move an object such as a tool or a table in any direction within X-, Y- and Z-axes that constitute a mechanical coordinate system. When the servo motors are driven and controlled by the servo motor control device, the object is moved to any desired position within the mechanical coordinate system.

Typically, the table of the machine is connected to a first servo motor that drives the table along the X-axis and to a second servo motor that drives the table along the Y-axis. Under control of the servo motor control device for controlling both the first and second servo motors, the table follows composite movements in the X and Y directions.

A previous servo motor control device comprises an interpolating section and a position control section for determining and attempting to move an object along a target locus. The interpolating section establishes a series of target positions of the object on each of the coordinate axes for a series of time intervals, each time interval having a predetermined minimum unit time, for example, 10 msecs. The position control section controls the rotational speeds of the individual servo motors, using the same prescribed position control gain for each of the coordinate axes, and based on a deviation between the target position of the object and the current position thereof.

However, a number of disadvantages have been encountered in connection with the above-described previous servo motor control device. One disadvantage is a time lag involved in transmitting, on a time-sharing basis, the target position of the object from the interpolating section to a position controller for each of the coordinate axes. Another disadvantage is that the individual position controllers for each coordinate axis have their own intrinsic delays in responding to incoming signals. Consequently, the object cannot be moved accurately to target positions if the same position control gain is used to control the servo motors on each axis.

OBJECTS AND SUMMARY OF THE INVENTION

It is an object of the present invention to overcome the above-described drawbacks and disadvantages, and to provide a control device for controlling servo motors that moves an object accurately along a target locus.

It is another object of the present invention to provide a control device for controlling servo motors that prevents response delays in the movement of the object due to any time lags which may be involved in transmitting a target position of the object from an interpolating section to a position controller for each axis on a time-sharing basis.

It is another object of the present invention to provide a control device for controlling servo motors that prevents intrinsic response delays of the individual position controllers used with the servo motors from affecting the accuracy at which an object is moved thereby.

To attain these and other objects, and to overcome the shortcomings set forth above, according to the present invention, there is provided a control device for controlling a plurality of servo motors to move an object to a predetermined position in a mechanical coordinate system. The control device includes: a moving means for moving an object to a desired position within the mechanical coordinate system;

position detecting means for detecting a current position of the object on each of the coordinate axes constituting the mechanical coordinate system;

interpolating means for setting a target position to which the object is to be moved on each coordinate axis by performing an appropriate interpolation based on an externally supplied move command;

revolution control means for controlling a number of servo motor revolutions that each servo motor will be rotated within a predetermined time period using a prescribed control gain individually set for each of the servo motors associated with each coordinate axis and in accordance with a deviation between the detected current position of the object and the target position thereof; and control gain controlling means for controlling the control gain individually set for use in controlling the rotation of each servo motor on each of the coordinate axes based on the occurrence of control response delays by the revolution control means relative to each axes.

In the above-mentioned control device for controlling a plurality of servo motors according to the invention, the interpolating means first responds to an externally supplied move command and performs interpolation accordingly so as to set a target position on each of the coordinate axes. The revolution control means then controls the revolutions of the servo motors using a control gain individually set for each coordinate axis and based on a deviation detected between the target position of the object and the current position thereof.

If there occurs a response delay in a control operation by the revolution control means on any of the coordinate axes, the control gain controlling means changes the control gains set for the individual coordinate axes in accordance with that response delay. Using the changed control gain, the revolution control means controls the number of revolutions of each servo motor which are to occur within a predetermined time period.

In the control device above, any servo motor systems located on coordinate axes which have no response delays keep their control gain unchanged while a coordinate axis experiencing a response delay has its gain changed as needed. The revolutions of the individual servo motors are controlled in this manner so that the object is moved to the target position.

BRIEF DESCRIPTION OF THE DRAWINGS

The foregoing and other objects, features and advantages of the present invention will become more apparent by reading the following detailed description of presently preferred embodiments of the present invention, when considered in connection with the accompanying drawings, in which:

FIG. 2 (A) is a view describing a position error which occurs due to a time lag involved during a movement of an object to a target position;

FIG. 2 (B) is a view depicting an illustrative correction of the position error which otherwise would occur due to the time lag;

DETAILED DESCRIPTION OF THE PREFERRED EMBODIMENT

Figure 1:
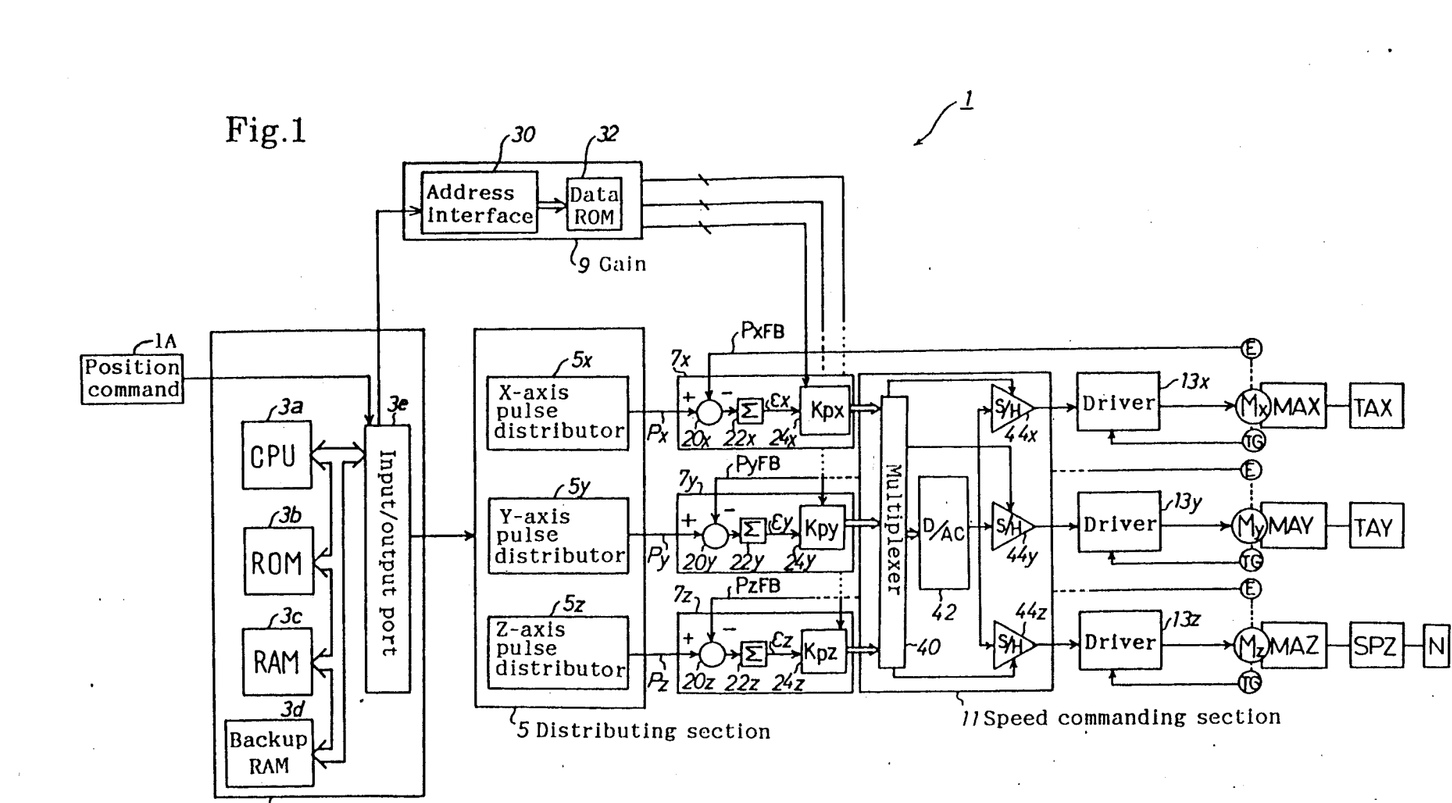
FIG. 1 is a block diagram of a control device for controlling a plurality of servo motors according to one embodiment of the invention.

One preferred embodiment of the present invention is shown in FIGS. 1-4. As illustrated in FIG. 1, a servo motor control device 1 is utilized in a tapping machine taken as one example of a typical machine tool. The servo motor control device 1 comprises three servo motors Mx, My and Mz. These three servo motors Mx-Mz are incorporated, respectively, into mechanical transmissions MAX, MAY and MAZ which in turn control movement along the X-, Y- and Z-coordinate axes, respectively.

The servo motors Mx-Mz are each equipped with a shaft encoder E which functions as position detecting means for detecting the position of the object (in the described example, a tool) along each coordinate axis, mentioned above. Each of the servo motors Mx-My also has a tachometer generator TG. The tachometer generators TG detect actual rotational speeds of the servo motors Mx-Mz.

In the tapping machine, an X-axis table TAX is connected to the mechanical transmission MAX, a Y-axis table TAY is connected to the mechanical transmission MAY, and a spindle SPZ is connected to the mechanical transmission MAZ, the spindle moving in the Z-axis direction. The tip of the spindle SPZ is equipped with a tool N.

The amount of movement of the tool N corresponds on each axis to the number of revolutions of each of the servo motors Mx-Mz. In this manner, the tool N is moved to a desired position in the mechanical coordinate system defined by the X-, Y- and Z-axes. The mechanical transmissions MAX, MAY and MAZ represent the above-mentioned moving means for moving an object to a desired position within a mechanical coordinate system.

Moving the tool N to a target position along a movement locus is accomplished by connecting the servo motor control device 1 to a superior commanding device (or position command) 1A. The superior commanding device 1A issues data which is used by the interpolating section for designating the movement locus and each of the target positions along the movement locus.

The servo motor control device 1 includes an interpolating section 3 for calculating the movement locus and the target positions on each coordinate axis based on the data supplied from the superior commanding device 1A. The interpolating section 3 is connected to a distributing section 5 which outputs a pulse train signal for each of the coordinate axes in accordance with the result of the calculations made by the interpolating section 3. Accordingly, interpolating section 3 functions as a means for setting target positions on each of the coordinate axes of a mechanical coordinate system.

The distributing sections 5x, 5y, and 5z are provided individually for each of the X-, Y- and Z-coordinate axes, and are connected to rotational speed controllers 7x, 7y and 7z. The rotational speed controllers 7x, 7y and 7z control the rotational speeds of the servo motors Mx-Mz, respectively, based on pulse train signals Px, Py and Pz supplied from the distributing sections 5x-5z as well as on feedback pulses PxFB, PyFB and PzFB, to be described below.

The rotational speed controllers 7x, 7y and 7z are connected to a speed commanding section 11. The speed commanding section 11 outputs a speed command signal based on the outputs from the rotational speed controllers 7x, 7y and 7z.

The speed commanding section 11 is connected to drivers 13x, 13y and 13z. The drivers 13x-13z drive and control the servo motors Mx-Mz based on the speed command signals supplied from the speed commanding section 11 and also on the actual rotational speeds of the servo motors Mx-Mz as detected by tachometer generators TG.

The rotational speed controllers 7x, 7y and 7z and the interpolating section 3 are connected to a gain setting section 9 which sets individual position loop gains for the rotation speed controllers 7x-7z.

In the embodiment of FIG. 1, the rotational speed controllers 7x-7z, the speed commanding section 11 and the drivers 13x-13z function as revolution control means for controlling the number of servo motor revolutions for each servo motor, and the gain setting section 9 is a control gain controlling means for controlling a control gain to be used for each coordinate axis.

The interpolating section 3 constitutes a logic operation circuit whose major components include a CPU 3a, a ROM 3b, a RAM 3c, a backup RAM 3d and an input/output port 3e. The CPU 3a receives, through the I/O port 3e, move command data from the superior commanding device 1A. This move command data designates a movement locus of the tool N, the locus being made of linear, circular or other movements. In turn, the CPU 3a stores the move command data into the RAM 3c.

The ROM 3b contains programs and a speed data table. The programs contained in ROM 3b include a program for obtaining the data for linear or circular arc interpolation depending on the designated movement locus, as well as a program for accelerating or decelerating the servo motors Mx-Mz using prescribed acceleration and deceleration constants as the tool N is moved along the movement locus. The data obtained by these programs defines a series of target positions of the object on each of the coordinate axes at a series of time intervals, each time interval having a predetermined minimum unit time, e.g., 10 msec.

The CPU 3a executes programs in order to calculate target positions and the corresponding amounts of movement at time intervals having a prescribed minimum unit time for each of the X-, Y- and Z-axes. The CPU 3a also executes necessary processing to extract speed data for each axis from the speed data table in the ROM 3b, thereby accelerating or decelerating the servo motors Mx-Mz using the predetermined acceleration and deceleration constants. The calculated target position data and speed data are output by the CPU 3a to the distributing section 5 via the I/O port 3e.

As part of the process for initializing the ROM 3b and other parts of the control device, the interpolating section 3 reads from the ROM 3b response time lag data relative to each coordinate axis and outputs this response time lag data to the gain setting section 9. The response time lag data can be input in advance from a data input device of the machine tool and is stored in a prescribed area of the backup RAM 3d. The processes for effecting linear and circular arc interpolation and for obtained speed data are well known and the details thereof are thus omitted. For example, see Japanese Laid-Open Patent No. 63-146108 and Japanese Laid-Open Patent No. 64-22486.

The distributing section 5 comprises pulse distributors 5x, 5y and 5z made of clock counters and gates. The distributing section 5 is disclosed in Japanese Laid-Open Patent No. 63-146108 and the details thereof are thus omitted here. Upon receipt of target position data and speed data from the interpolating section 3, the distributing section 5 outputs pulse train signals Px, Py and Pz (called distributed pulses) representing the target position and speed data to the rotational speed controllers 7x-7z.

The rotational speed controllers 7x-7z, in turn, control the rotational speeds of the servo motors Mx-Mz in accordance with the distributed pulses Px-Pz from the distributing section 5. The rotational speed controllers 7x-7z contain comparators 20x, 20y and 20z which accept outputs of the distributed pulses Px-Pz.

The comparators 20x, 20y and 20z are connected respectively to integrators 22x, 22y and 22z for accumulating signal pulses. The comparators 20x, 20y and 20z determine the differences between the distributed pulses Px-Pz and the rotation angle detection pulses PxFB, PyFB and PzFB (called feedback pulses), the latter pulses being input from the shaft encoders E attached to the servo motors Mx-Mz. Accordingly, the comparators determine the difference between a target position and an actual position of the object to be moved. The comparators 20x-20z then supply the integrators 22x-22z with pulses corresponding to the differences detected.

The integrators 22x, 22y and 22z are connected to multipliers 24x, 24y and 24z, respectively. By adding the difference-representing pulses supplied by comparators 20x-20z to previously supplied pulses which have been accumulated by the integrators 22x-22z, the integrators 22x-22z calculate accumulated pulses $\epsilon x$, $\epsilon y$ and $\epsilon z$ indicative of the current differences between the target and actual positions and output the accumulated pulses $\epsilon x$, $\epsilon y$ and $\epsilon z$ to the multipliers 24x, 24y and 24z. Integrators 22x-z accumulate the pulses output by comparators 20x-z during the entire operation to detect deviations between the current position and target position.

The multipliers 24x, 24y and 24z are connected to the gain setting section 9. The multipliers 24x-24z multiply the accumulated pulses $\epsilon x$-$\epsilon z$ supplied from the integrators 22x-22z by position loop gains Kpx, Kpy and Kpz, the gains being set based on gain data, to be described below, from the gain setting section 9. The multiplications are performed in order to determine rotational speed command signals which are to be directed to the servo motors Mx-Mz.

The multipliers 24x, 24y and 24z are connected to the speed commanding section 11. The rotational speed command signals, which consist of digital signals, are output by the multipliers 24x-24z to the speed commanding section 11.

Figure 4:
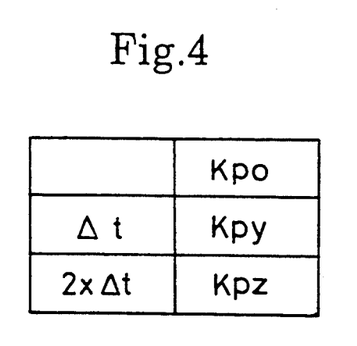
FIG. 4 is a view showing a table used by the FIG. 3 embodiment for correcting a position error due to a time lag involved during a movement of the object to a target position.

The gain setting section 9 comprises a data ROM 32 and an address interface 30 for designating a particular area in the data ROM 32. The designated area in the data ROM 32 contains data relating to the response time lags of the control system for each of the coordinate axes relative to position commands, as shown in FIG. 4. (For example, a table of data groups of position loop gains is established beforehand and stored in the ROM 32 for each coordinate axis based upon: the time lag appearing in the time-sharing sequence of a multiplexer 40, to be described below; the time lag occurring in each position controller; and the time lag involved when the rotational speed controllers 7x-7z operate on a time-sharing basis.)

When the response time lag data on each coordinate axis is input into gain setting section 9 from the interpolating section 3 based on the type of position command supplied by position command 1A, the address interface 30 designates the address of the above-mentioned table, reads the position loop gain data corresponding to the inputted time lag data therefrom, and outputs the gain loop data from the ROM 32 to the multipliers 24x-24z. For a coordinate axis with no time lag, the data of a prescribed basic control gain KpO is output.

The speed commanding section 11 comprises a multiplexer 40 for receiving rotational speed command signals from the distributors on a time-sharing basis; a D/A converter 42 for receiving signals from the multiplexer 40; and sample hold circuits 44x, 44y and 44z, one for each axis, adapted to receive the signals from the multiplexer 40 and from the D/A converter 42.

The speed commanding section 11 receives rotational speed command signals from the rotational speed controllers 7x-7z, converts the signals into rotational speed command signals for each of the servo motors Mx-Mz, and outputs the converted signals to the drivers 13x-13z.

In the speed commanding section 11, the multiplexer 40 connects the D/A converter 42 to one of the rotational speed controllers 7x-7z at a time, in a predetermined time-sharing sequence (e.g., at intervals of $\Delta t$, from X-axis to Y-axis to Z-axis). At the same time, the multiplexer 40 outputs a latch command to the sample hold circuit (one of 44x-44z) corresponding to the coordinate axis which is currently connected to D/A converter 42.

The D/A converter 42 converts into analog voltage signals the rotation command signals supplied from rotational speed controller 7x-7z constituted by digital signals, and outputs the resulting analog voltage signals as speed commands. The sample hold circuits 44x-4z hold the analog voltage signals and output them as speed command signals to the drivers 13x-13z of the respective axes.

Thus in response to a position command, the speed command signal is delayed by $\Delta t$ for the Y-axis and by $2\Delta t$ for the Z-axis before being output to the drivers 13y and 13z. That is, the driver 13y for the Y-axis sustains a time lag of $\Delta t$ and the driver 13z for the Z-axis sustains a time lag of $2\Delta t$.

The drivers 13x-13z comprise known pulse width modulation (PWM) circuits and energizing circuits. These drivers 13x-13z maintain the rotational speeds of the servo motors Mx-Mz at the command speed by raising or lowering the energizing current in accordance with deviations measured between the speed command and the actual rotational speeds of the servo motors, the deviations being detected by the tachometer generators TG attached to these motors. The drivers 13x-13z are known servo motor drivers and the details thereof are thus omitted.

The rotational speed controllers 7x-7z, in combination with the speed commanding section 11 and the drivers 13x-13z, constitute a closed loop control system for controlling the servo motors Mx-Mz so as to move the tool N to target positions.

What follows is a description of how the servo motor control device 1 works. The superior commanding device (Position Command) 1A supplies the interpolating section 3 with a command, for example, specifying that the tool N be moved along a linear locus L with a gradient of $\theta$ on an X-Y axis plane at a speed of F (mm/min.) (f pulses/sec. in pulse-converted speed). Upon receipt of the command, the interpolating section 3 performs linear interpolation and calculates the target position to be reached and the amount of movement at intervals of a predetermined minimum unit time for each of the X-, Y- and Z-axes. That is, a series of target positions and corresponding amounts of movement are determined for a series of time periods, each time period having a unit time duration. The resulting data is output to the distributing section 5.

Based on the output signal carrying the calculated result, the distributing section 5 outputs pulse train signals to the rotational speed controllers 7x-7z of the respective coordinate axes. The rotation speed controllers 7x-7z determine the rotational speeds of the servo motors Mx-Mz by multiplying the accumulated pulses $\epsilon x$-$\epsilon z$, which represent the deviations involved, by the position loop gains Kpx-Kpz.

Figure 2A:
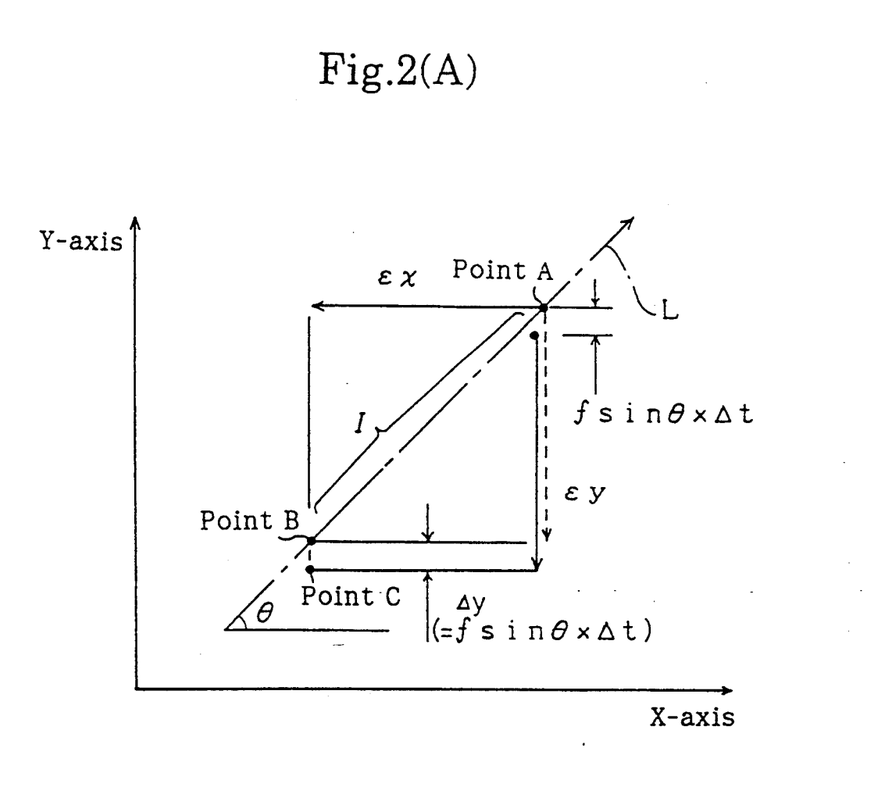

As illustrated in FIG. 2 (A), point A denotes the target position on the linear locus L which is to be reached at the expiration of a unit time period t. If there is no time lag in the control system of the X- and Y-axes, the accumulated pulses $\epsilon x$ and $\epsilon y$ for the X- and Y-axes at the time t are given by the equations shown below. The servo motor Mz for the Z-axis is assumed to be at rest.

$$\epsilon x = f \cos \theta / KpO \text{[pulse]}$$

$$\epsilon y = f \sin \theta / KpO \text{[pulse]}$$

where, Kpx=Kpy=KpO. If the tool is located at a point B on the linear locus L. The distance I between point A and point B is given by $$I = f / KpO \text{[pulse]}$$

In order for an object to move from point B to point A, the rotational speeds (in pulses/sec) of the servo motors Mx and My are determined by the rotational speed controllers 7x and 7y as follows:

$$(Kpx)\cdot(\epsilon x) = f \cos \theta \text{[pulse/sec]}$$

$$(Kpy)\cdot(\epsilon y) = f \sin \theta \text{[pulse/sec]}$$

Thus the servo motors Mx and My rotate according to the rotational speed command supplied from the speed commanding section 11 in such a manner that the tool N is moved to the target position.

However, since the control system of the Y-axis possesses the time lag of $\Delta t$, as described above, the actual tool position is a point C which is delayed by $\Delta y = (f \sin \theta) \cdot (\Delta t)$ on the Y-axis. This position is off the linear locus L and represents a position error.

According to the present invention, the position error is corrected by increasing the amount of movement in the Y-axis direction. That is, the rotational speed of the servo motor My is increased by establishing the position loop gain of the rotational speed controller 7y for the Y-axis in accordance with the time lag $\Delta t$.

If Kpy stands for the established position loop gain and Edy for the accumulated pulses at the unit time t, locating the tool N on the linear locus L requires fulfilling the equations:

$$Edy = \epsilon y - (f \sin \theta) \cdot (\Delta t)$$

$$Edy = f \sin \theta / Kpy$$

$$\epsilon y = f \sin \theta / KpO$$

$$(f \sin \theta / Kpy) = (f \sin \theta / KpO) - (f \sin \theta) \cdot (\Delta t)$$

By removing $f \sin \theta$ from both equations above and arranging them, we find that the condition $$Kpy = 1/\{(1/KpO) - \Delta t\} \tag{1}$$

needs to be fulfilled.

Figure 2B:
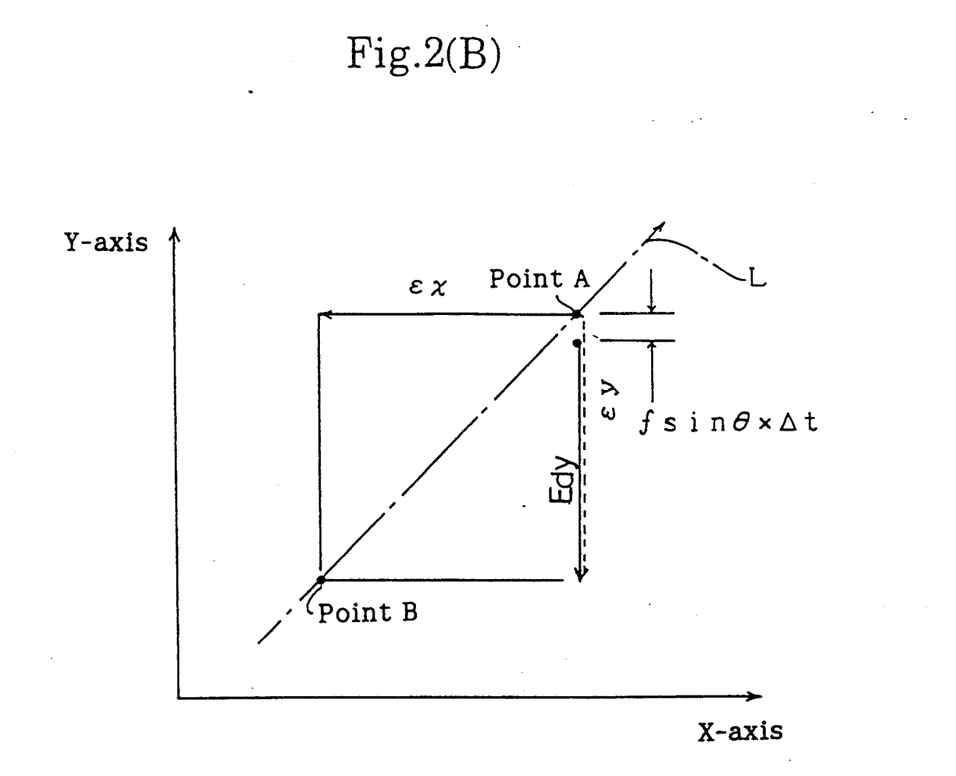

Thus, as depicted in FIG. 2 (B), if the position loop gain Kpy is set based on equation (1), the accumulated pulses at the rotational speed controller 7y are $\epsilon y$. In this manner, the tool N is moved to the point B on the target locus L.

If the tool N is specified to follow a linear locus L with a gradient of $\theta$ on a Y-axis plane, the time lag on the Z-axis is $2\Delta t$. In this case, as in the foregoing example, the condition $$Kpz = 1/\{(1/KpO) - 2\Delta t\} \tag{2}$$

needs to be fulfilled The position loop gain Kpz is established on the basis of equation (2).

In this embodiment, the position loop gains Kpx-Kpz obtained in the manner described above are stored in the data ROM 32 of the gain setting section 9. The position loop gains Kpx (=KpO), Kpy and Kpz are set based on the time lags $\Delta t$ and $2\Delta t$. The value of KpO is determined in advance by experimentation, and can be different for different machines. The rotational speed is increased by operating the rotational speed controllers 7y and 7z with increased position loop gains to compensate for the time lags $\Delta t$ and $2\Delta t$, the time lags representing the delays involved when the speed commanding section 11 outputs speed command signals to the drivers 13y and 13z. Therefore, the accumulated pulses $\epsilon x$-$\epsilon z$ at the rotational speed controllers 7x-7z for each coordinate axis become the same as those in effect when there is no time lag. The speed commanding section 11 outputs rotational speed commands based on the speed commands output by the rotational speed controllers 7y-7z. The drivers 13x-13z control energizing currents which are provided to the servo motors Mx-Mz in accordance with deviations between the speed commands and the actual speed. Thus, the rotational speeds of the servo motors Mx-Mz can be controlled in the manner described above so that the tool N moves along the linear locus L. In this embodiment, the position loop gain is set to KpO (basic gain) for the X-axis where there is no response delay; the position loop gains Kpy and Kpz (which are related to KpO according to equations (1) and (2) above, respectively) are set for the Y- and Z-axes where there are response delays $\Delta t$ and $2\Delta t$, respectively. By controlling the rotational speeds of the servo motors Mx-Mz using the above settings, the tool is moved precisely to each target coordinate position along the designated movement locus L.

Figure 3:
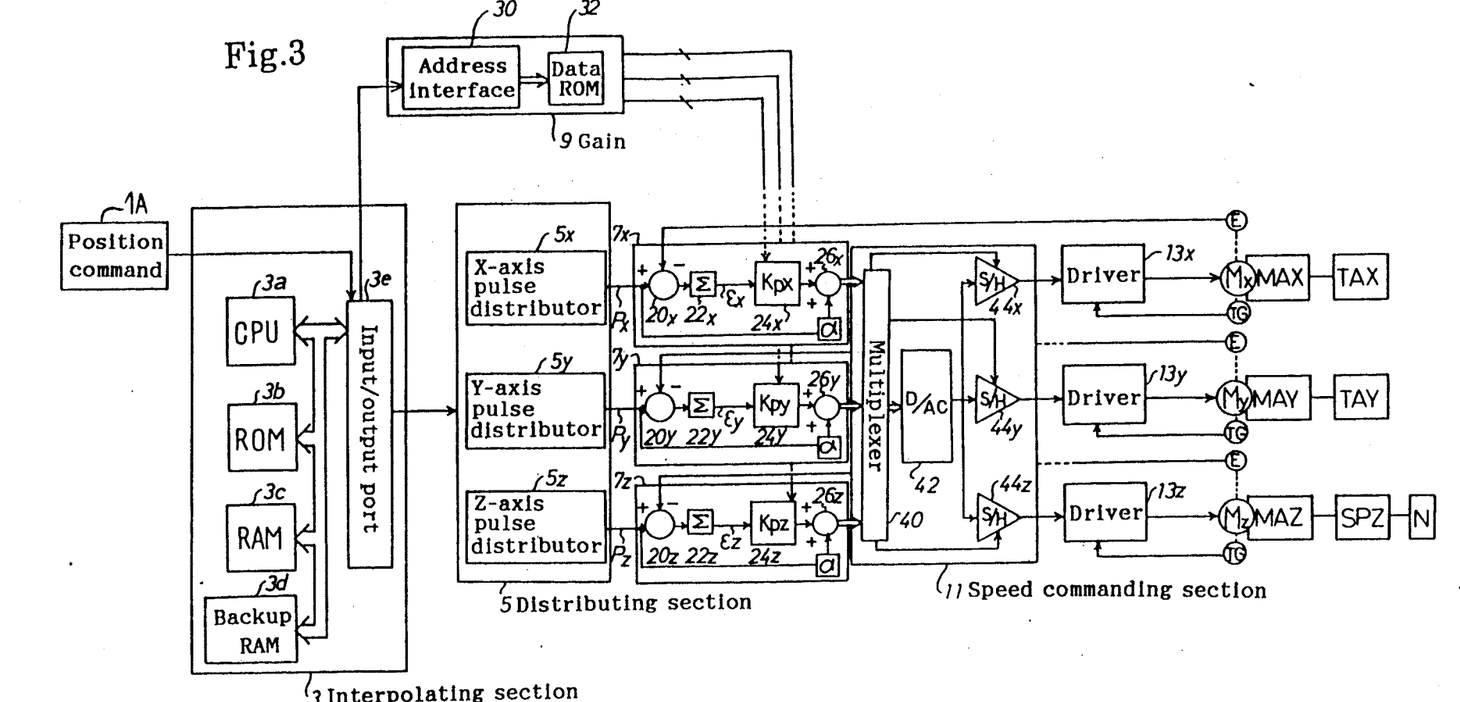
FIG. 3 is a block diagram of a variation of the FIG. 1 embodiment which provides position control through a feed forward scheme.

In the above-described embodiment, the rotational speed controllers 7x-7z constitute a closed loop control system. Alternatively, a variation of the FIG. 1 embodiment is a feed forward control system as illustrated in FIG. 3. The construction of the rotational speed controllers 7x-7z for the feed forward control system varies from the feedback control system, however the remaining portions are the same therebetween. In both embodiments, like reference characters designate like or corresponding parts, and any repetitive descriptions thereof are omitted.

In the above variation of the first embodiment, the rotational speed controllers 7x-7z are supplemented by adders 26x, 26y and 26z. These adders 26x-26z add an amount of feed forward to the outputs of the multipliers 24x-24z in the rotational speed controllers 7x-7z. The amount of feed forward is determined based on a prescribed feed forward rate $\alpha$. The outputs of the multipliers 24x-24z are obtained by multiplying the accumulated pulses $\epsilon x$-$\epsilon z$ by the position loop gains Kpx-Kpz, respectively. More specifically, each of the pulses Px, Py, and Pz are multiplied by $\alpha$, each of the results being supplied to adders 26x-z, respectively. These parts constitute a feed forward position control system.

In the above scheme, the accumulated pulses Edy are reduced by the added amount of feed forward. Thus, to move the tool to the target position requires fulfilling the equations:

$$Edy = (f \sin \theta / Kpy) \cdot (1-\alpha)$$

$$\epsilon y = (f \sin \theta / KpO) \cdot (1-\alpha)$$

$$Edy = \epsilon y - (f \sin \theta) \cdot (\Delta t)$$

From these, we get:

$$(f \sin \theta / Kpy) \cdot (1-\alpha) = (f \sin \theta / KpO) \cdot (1-\alpha) - (f \sin \theta) \cdot (\Delta t)$$

Arranging the above equation, we find that the condition $$1/Kpy = 1/KpO - \Delta t (1-\alpha) \quad (3)$$

needs to be fulfilled. Similarly, the condition $$Kpz = 1/\{(KpO) - 2\Delta t/(1-\alpha)\} \quad (4)$$

also needs to be met.

If the position loop gains Kpy and Kpz are set based on equations (3) and (4), the accumulated pulses at the rotational speed controllers 7y and 7z become $\epsilon y$ and $\epsilon z$, respectively, as in the case of feedback control. This allows the tool to move precisely along the target locus.

Because of its applicability to both feedback control and feed forward control, the present invention contributes to improving the accuracy of servo motor position control in a wide range of applications.

While the foregoing description of the preferred embodiment centered on examples of linear interpolation, circular arc interpolation is addressed likewise by setting position loop gains according to the response delay occurring on each coordinate axis when circular arcs are formed. This allows the tool likewise to move along a designated movement locus in applications of circular arc interpolation.

In the described embodiment, the response delays $\Delta t$ and $2\Delta t$ of the position control system for each coordinate axis are input in advance from a data input device. Alternatively, there may be devised a setup in which a time lag is detected between the time the interpolating section 3 outputs interpolation data and the time the sample hold circuits 44x-44z output a speed command, with the position loop again being established in accordance with the time lag detected. In that case, even more precise position control is made available.

In the above-described embodiments, three servo motors Mx, My and Mz attached to the mechanical transmissions MAX, MAY and MAZ are driven and controlled by the servo motor control device 1. In operation, the tool N is moved in the Z-axis direction while a workpiece mounted on the X-axis table TAX and Y-axis table TAY is moved relative to the tool N. As the servo motors Mx-Mz rotate, the tool (e.g., drill) is moved in each coordinate axis direction. Alternatively, the invention may be applied to other types of machine tools.

In addition to machine tools that move their work tables and machining heads, the invention may be applied to any apparatus in which an object is moved to desired positions in a machine coordinate system by controlling a plurality of servo motors.

As described, the control device according to the invention changes the control gain as needed of any coordinate axis having a response delay, while leaving unchanged the control gain of a coordinate axis with no response delay, thereby controlling the revolutions of individual servo motors. In this manner, the object to be controlled is moved accurately to target positions on each coordinate axis according to move commands.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A control device for controlling a plurality of servo motors to move an object to a predetermined position in a mechanical coordinate system having a plurality of coordinate axes based on an externally supplied move command, said control device comprising:

position detecting means for detecting a current position of said object on each of the coordinate axes of said mechanical coordinate system;

interpolating means for setting a target position on each of said coordinate axes by interpolating the externally supplied move command;

revolution control means for controlling a number of revolutions of each of said servo motors using a prescribed control gain individually set for each of said coordinate axes and in accordance with a difference between the detected current position of said object and the target position thereof on each of said coordinate axes; and control gain controlling means for controlling the control gain individually set for each of said coordinate axes based on control response delays which occur in said revolution control means relative to each axis.

2. The control device according to claim 1, wherein said control gain controlling means maintains a prescribed reference control gain for any coordinate axis having no response delay.

3. The control device according to claim 1, wherein said control gain controlling means includes a table, stored in a memory, which correlates an appropriate control gain for each of said coordinate axes upon occurrence of the control response delays by said revolution control means relative to each axis.

4. The control device according to claim 3, wherein said table contains data groups of control gains which are established in advance for each of said coordinate axes according to response time lags of the revolution control means.

5. The control device according to claim 3, wherein said table contains data groups of control gains which are established in advance for each of said coordinate axes according to time lags involved due to said revolution control means operating on a time-sharing basis for each servo motor.

6. The control device according to claim 1, wherein said revolution control means includes rotational speed controllers which determine rotational speeds for rotating said servo motors by multiplying accumulated pulse counts output from said interpolating means by said prescribed control gains.

7. A control device for controlling a plurality of servo motors to move an object to a predetermined position in a mechanical coordinate system having a plurality of coordinate axes, based on an externally supplied move command, said control device comprising:
position detecting means for detecting a current position of said object on each of the coordinate axes of said mechanical coordinate system;
interpolating means for setting a target position on each of said coordinate axes by interpolating the externally supplied move command;
revolution control means for controlling a number of revolutions of each of said servo motors using a control gain individually set for each of said coordinate axes and in accordance with a difference between the detected current position of said object and the target position thereof on each of said coordinate axes, said revolution control means operating on a time-sharing basis so that control signals are output by said revolution control means to each of the respective servo motors with time delays therebetween; and
control gain controlling means for controlling the control gain individually set for each of said coordinate axes based on control response delays which occur in each of the respective servo motors due to said time delays.

8. The control device according to claim 7, wherein said control gain controlling means maintains a reference control gain for any coordinate axis having no response delay.

9. The control device according to claim 7, wherein said control gain controlling means includes a table, stored in a memory, which correlates the control gain for each of said coordinate axes upon occurrence of the control response delays by said revolution control means relative to each axis.

10. The control device according to claim 9 wherein said table contains data groups of control gains which are established in advance for each of said coordinate axes according to said time delays.

11. The control device according to claim 7, wherein said revolution control means includes rotational speed controllers which determine rotational speeds for rotating the servo motors by multiplying accumulated pulse counts output from said interpolating means by said individually set control gains.

12. A control device for controlling at least two servo motors to move an object to a predetermined position in a mechanical coordinate system having a corresponding coordinate axis for each of said servo motors, based on an externally supplied move command, said control device comprising:
position detecting means for detecting a current position of said object on each of the coordinate axes of said mechanical coordinate system;
interpolating means for setting a target position on each of said coordinate axes by interpolating the externally supplied move command;
revolution control means for controlling each of said servo motors using a prescribed control gain individually set for each of said coordinate axes and in accordance with a difference between the detected current position of said object and the target position thereof on each of said coordinate axes, said revolution control means outputting a corresponding control signal to each of the servo motors, with a time delay between the output signal provided to each respective servo motor; and
control gain controlling means for controlling the control gain individually set for each of said coordinate axes based on control response delays which occur in each of the respective servo motors due to said time delay.

13. The control device according to claim 12, wherein said control gain controlling means maintains a reference control gain for any coordinate axis having no response delay.

14. The control device according to claim 12, wherein said control gain controlling means includes a table, stored in a memory, which correlates the control gain for each of said coordinate axes upon occurrence of the control response delay by said revolution control means relative to each axis.

15. The control device according to claim 14 wherein said table contains data groups of control gains which are established in advance for each of said coordinate axes according to said time delays.

16. The control device according to claim 12, wherein said revolution control means includes rotational speed controllers which determine rotational speeds for rotating the servo motors by multiplying accumulated pulse counts output from said interpolating means by said individually set control gains.

* * * * *